Sept. 10, 1946.  A. F. PFINGSTEN  2,407,444
TRACTOR OPERATED POST DRIVER
Filed Oct. 23, 1944
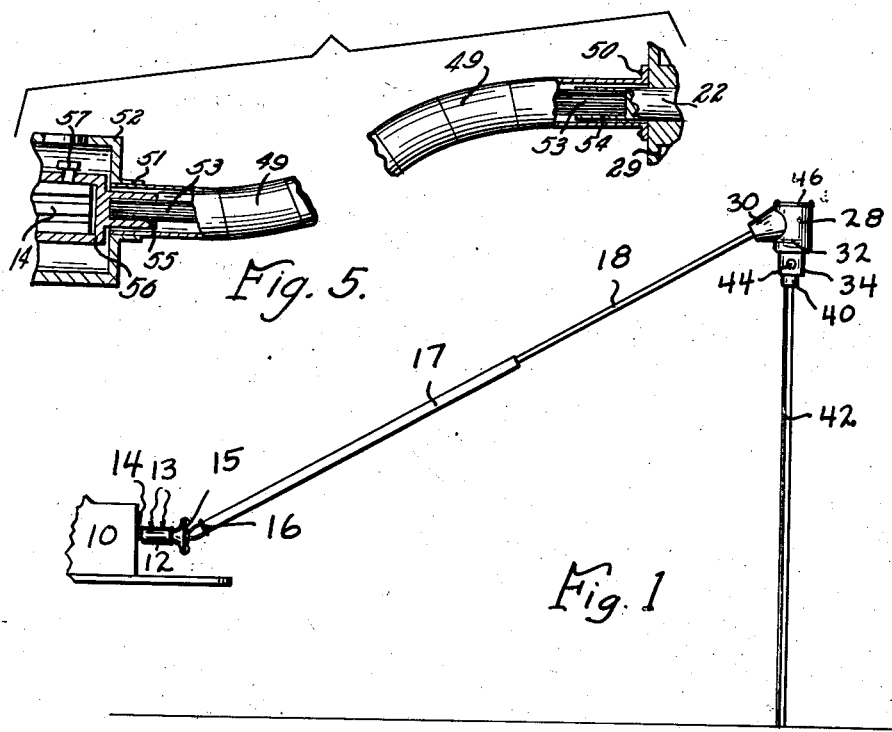
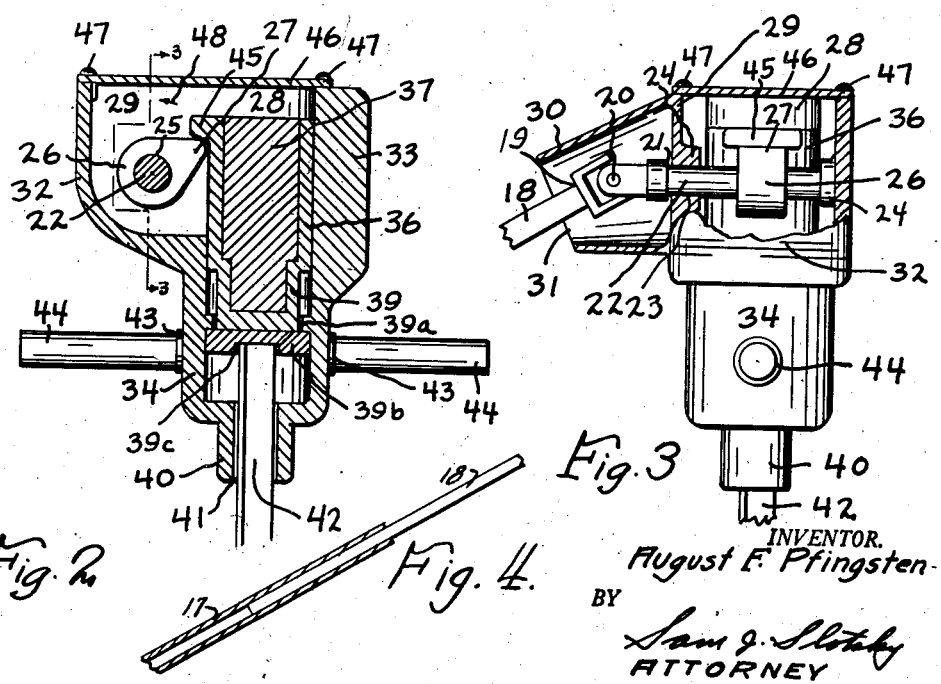
INVENTOR.
August F. Pfingsten
BY
Sam J. Slotky
ATTORNEY Patented Sept. 10, 1946

2,407,444

UNITED STATES PATENT OFFICE 2,407,444

TRACTOR OPERATED POST DRIVER

August F. Pfingsten, Rock Rapids, Iowa

Application October 23, 1944, Serial No. 559,983

9 Claims. (Cl. 61—73)

My invention relates to a post driver.

An object of my invention is to provide a fence post driver which can be driven by the power take-off shaft of a tractor.

A further object of my invention is to provide a driving head which can be readily placed over the top of a fence post to be driven, and which allows the post to be aligned vertically as the striking impulses are applied.

A further object of my invention is to provide a driving arrangement as above described, which can be positioned at any desired elevation, or at any desired lateral position with respect to the tractor power take-off shaft, so that the device can be operated from the tractor regardless of the position of the tractor.

A further object of my invention is to provide a post driver which can be easily and readily attached to the tractor power take-off, which includes a minimum of parts, and is simple to manufacture.

With these and other objects in view, my invention consists in the construction, arrangement, and combination of the various parts of my device, whereby the objects contemplated are attained, as hereinafter more fully set forth, pointed out in my claims, and illustrated in the accompanying drawing, in which:

Figure 1 is a side elevation of the arrangement as used in combination with a tractor power take-off.

Figure 2 is a sectional detail of the impacting head,

Figure 3 is a sectional view of Figure 2 taken substantially along the lines 3—3 thereof, Figure 4 is a detail of the telescoping driving shaft, and Figure 5 is a detail of part of the device as operated by means of a flexible driving shaft.

My invention contemplates the provision of a unit driving head including a reciprocating impacting member which is driven by the power take-off shaft of a tractor, which head can also be moved substantially to any position with respect to the tractor so that it will not be necessary to locate the tractor at an exact position when the device is being used.

I have used the character 10 to designate the rear housing of a tractor, and the character 11 of the draw bar of the tractor. My device further includes a socket 12 which is attached by means of the screws 13 to the tractor power take-off shaft 14. Attached to the member 12 is a universal joint 15 which is attached at 16 to a hollow square shaft 17. Received within the hollow shaft 17 is the solid square shaft 18 which extends a substantial distance within the shaft 17.

The shaft 18 is attached at 19 to a further smaller universal joint 20 which is attached at 21 to a shaft 22 which is journalled at 23 within suitable bosses 24, and attached at 25 to the shaft 22 is a cam 26 having a projecting cam portion 27. The bosses 24 are integral extensions of a hollow casting 28, the shaft 22 passing through one of the side walls 29 thereof. Extending from the side wall 29 is a substantially frusto-conical guard member 30 which is adapted to cover the joint 20 and which includes an opening 31 large enough to permit any side movement of the shaft 18. The housing 28 also includes further walls 32 for enclosing the cam and includes a thickened wall at the other side as indicated by the character 33 which thickened wall will balance the arrangement.

Extending from the casing 28 is a cylindrical portion 34 which includes the cylindrical cavity 35 therein which cavity receives the cylindrical striking piston 36, the piston 36 being filled with lead or similar heavy metal 37 to provide a greater weight. The piston 36 includes a lower wall 38. The piston 36 also includes the indented cylindrical portion 39, and extending inwardly from the cylindrical walls 34 is an integral annular ring 39a, and positioned beneath the ring 39a is a slidable member 39b having a cavity 39c for receiving the top of the fence post 42. Extending from the cylindrical portion 34 is a further cylindrical guide portion 40 including the cylindrical opening 41 for receiving the top of the fence post 42 therein.

Attached at 43 to either side of the member 34 are a pair of extending horizontal cylindrical handles 44. Extending outwardly from the piston member 36 from one side thereof is a projecting portion 45 which is adapted to abut against the cam portion 27. A covering plate 46 is suitably attached by machine screws 47 to the top of the head, which plate can be removed for inspection or repairs.

The device operates in the following manner. First, the unit is coupled to the take-off shaft 14 by means of the socket 12, and is then ready for operation. The tractor is then driven to a position near the post 42 and the driving head is placed over the top of the post by merely lifting the unit by means of the handles 44, with the top of the post passing through the cylindrical opening 41 as shown in Figure 2. It will be noted that, by means of the telescoping shaft 18 and 17, the unit can be pulled outwardly a substantial distance from the tractor rear or conversely can be placed close to the tractor since the telescoping shaft will allow such a range of placement. Also it will be noted that the universal joints 15 and 20 will allow the unit to be placed substantially in any position laterally. In this manner the striking head can be utilized practically regardless of the position of the tractor, since free movement is allowed outwardly, inwardly, vertically or laterally.

The operator holds the handles 44 and positions the post 42 vertically, and then the power take-off shaft 14 is engaged. The shaft 22 will then be driven due to the above described arrangement and will rotate the cam in the direction of the arrow 48. As the cam portion 27 rises it will abut against the projecting portion 45 which will correspondingly raise the substantially heavy piston 36, and as soon as the cam portion 37 clears the portion 45, the piston 36 will drop, and impact against the member 39b which will drive against the top of the post 42, the fairly rapid rotation of the cam providing a series of rapid impacts against the post top and thereby driving the post downwardly into the ground. The abutment of the member 39b against the fixed annular ring 39a insures sufficient length of travel of the striking piston 36 at all times, since the member 39b limits the top of the post.

Figure 5 illustrates an alternate arrangement wherein a flexible cable arrangement having a flexible housing 49 is attached at 50 to the wall 29 and with the other end of the housing 49 being attached at 51 to the member 52 which is attached to a stationary part of the tractor. The stranded flexible shaft 53 is attached at 54 to the shaft 22, and is attached at 55 at the other end thereof to the member 56 which is attached at 57 to the power take-off shaft 14. This latter arrangement can also be employed, although the arrangement shown in Figures 1 to 4 inclusive is the preferred one since ordinarily the torque applied by the shaft arrangements shown in these figures is usually greater.

It will now be seen that I have provided all of the advantages mentioned in the object of my invention with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A tractor operated post driver comprising a rotatable shaft adapted to be attached to a tractor power take-off shaft, a driving head, said driving head having an opening for receiving the top of a fence post therein, means operated by said rotatable shaft for impacting against the top of the post, received in the head, said impacting means including a cam revolubly journalled in said head, said rotatable shaft driving said cam, a weighted impact member operated reciprocatingly by said cam.

2. A tractor operated post driver comprising a rotatable shaft adapted to be attached to a tractor power take-off shaft, a driving head, said driving head having an opening for receiving the top of a fence post therein, means operated by said rotatable shaft for impacting against the top of the post, received in the head, said impacting means including a cam revolubly journalled in said head, said rotatable shaft driving said cam, a weighted impact member operated reciprocatingly by said cam, said impact member adapted to provide impacting forces against the top of the fence post.

3. A tractor operated post driver comprising a rotatable shaft adapted to be attached to a tractor power take-off shaft, a driving head, said driving head having an opening for receiving the top of a fence post therein, means operated by said rotatable shaft for impacting against the top of the post, received in the head, said impacting means including a cam revolubly journalled in said head, said rotatable shaft driving said cam, a weighted impact member operated reciprocatingly by said cam, said impact member adapted to provide impacting forces against the top of the fence post, a flat abutment member received in said head, means for limiting upward movement of the abutment member to provide a complete stroke of the impact member when the top of a fence post bears against the abutment member.

4. A tractor operated post driver comprising a rotatable shaft adapted to be attached to a tractor power take-off shaft, a driving head, said driving head having an opening for receiving the top of a fence post therein, means operated by said rotatable shaft for impacting against the top of the post, received in the head, said impacting means including a cam revolubly journalled in said head, said rotatable shaft driving said cam, a weighted impact member operated reciprocatingly by said cam, said impact member adapted to provide impacting forces against the top of the fence post, a flat abutment member received in said head, means for limiting upward movement of the abutment member to provide a complete stroke of the impacting member when the top of a fence post bears against the abutment member, said rotatable shaft including universal joints at the tractor and at the head, for providing lateral or vertical range of movement of the shaft.

5. A tractor operated post driver comprising a rotatable shaft adapted to be attached to a tractor power take-off shaft, a driving head, said driving head having an opening for receiving the top of a fence post therein, means operated by said rotatable shaft for impacting against the top of the post, received in the head, said impacting means including a cam revolubly journalled in said head, said rotatable shaft driving said cam, a weighted impact member operated reciprocatingly by said cam, said impact member adapted to provide impacting forces against the top of the fence post, a flat abutment member received in said head, means for limiting upward movement of the abutment member to provide a complete stroke of the impacting member when the top of a fence post bears against the abutment member, said rotatable shaft including universal joints at the tractor and at the head, for providing lateral or vertical range of movement of the shaft, said rotatable shaft further including a hollow square shaft portion, a male shaft portion received in the hollow shaft portion, said portions being of substantial length to provide means for a substantial range of movement of the head outwardly with respect to the tractor.

6. A tractor operated post driver comprising a rotatable shaft adapted to be attached to a tractor power take-off shaft, a driving head, said driving head having an opening for receiving the top of a fence post therein, means operated by said rotatable shaft for impacting against the top of the post, received in the head, said impacting means including a cam revolubly journalled in said head, said rotatable shaft driving said cam, a weighted impact member operated reciprocatingly by said cam, said impact member adapted to provide impacting forces against the top of the fence post, a flat abutment member received in said head, means for limiting upward movement of the abutment member to provide a complete stroke of the impacting member when the top of a fence post bears against the abutment member, said rotatable shaft including universal joints at the tractor and at the head, for providing lateral or vertical range of movement of the shaft, said rotatable shaft further including a hollow square shaft portion, a male shaft portion received in the hollow shaft portion, said portions being of substantial length to provide means for a substantial range of movement of the head outwardly with respect to the tractor, said impacting member having a projecting portion to provide means for raising the impact member when said cam abuts thereagainst.

7. A tractor operated post driver comprising a drive shaft for attachment to a tractor power take-off shaft, a head, a vertically reciprocating impact member received in the head, the termination of said shaft being journalled in said head and including means for raising the impact member momentarily to cause it to thence drop by gravity, and to provide a series of such drops in rapid sequence, said head having an opening for receiving the top of a fence post whereby said impact member will strike thereagainst.

8. A tractor operated post driver comprising a drive shaft for attachment to a tractor power take-off shaft, a head, a vertically reciprocating impact member received in the head, the termination of said shaft being journalled in said head and including means for raising the impact member momentarily to cause it to thence drop by gravity, and to provide a series of such drops in rapid sequence, said head having an opening for receiving the top of a fence post whereby said impact member will strike thereagainst, a pair of handles attached to the head for holding and guiding the same.

9. A tractor operated post driver comprising a drive shaft for attachment to a tractor power take-off shaft, a head, a vertically reciprocating impact member received in the head, the termination of said shaft being journalled in said head and including means for raising the impact member momentarily to cause it to thence drop by gravity, and to provide a series of such drops in rapid sequence, said head having an opening for receiving the top of a fence post whereby said impact member will strike thereagainst, a pair of handles attached to the head for holding and guiding the same, said shaft having flexible characteristics whereby the head can be moved to substantial distances laterally, vertically, or rearwardly of a tractor.

AUGUST F. PFINGSTEN.